(12) United States Patent
Ohrbom et al.

(10) Patent No.: US 7,034,080 B1
(45) Date of Patent: Apr. 25, 2006

(54) PIGMENT DISPERSANT, METHOD OF MAKING COATING COMPOSITIONS, AND COATING COMPOSITIONS

(75) Inventors: Walter H. Ohrbom, Hartland Township, MI (US); Nicholas Caiozzo, St. Clair Shores, MI (US); Sergio Balatan, West Bloomfield, MI (US); Zenon Paul Czornij, Brighton, MI (US); Clair J. Certo, Dearborn Heights, MI (US); Janice E. Echols, Detroit, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 11/087,958

(22) Filed: Mar. 23, 2005

(51) Int. Cl.
*C08F 263/00* (2006.01)

(52) U.S. Cl. .................................... 525/278
(58) Field of Classification Search ............... 525/278, 525/327.3, 328.2, 329.7, 330.1, 498, 329.9, 525/378, 377, 374, 375; 524/548, 560, 561

See application file for complete search history.

(56) References Cited

U.S. PATENT DOCUMENTS 6,376,616 B1 * 4/2002 December .................. 525/278

* cited by examiner

*Primary Examiner*—Robert D. Harlan

(57) ABSTRACT

A coating composition comprises at least one pigment dispersed in an acrylic polymer, wherein the acrylic polymer is prepared by first polymerizing a mixture of ethylenically unsaturated monomers comprising:
(a) at least about 15% by weight unsaturated meta-isopropenyl-α,α-dimethylbenzyl isocyanate;
(b) at least one further aromatic polymerizable monomer, in an amount so that monomers (a) and (b) combined are at least about 50 percent by weight of the mixture of ethylenically unsaturated monomers; and
(c) at least one alkyl (meth)acrylate to form a polymer, and secondly, reacting the isocyanate groups of the polymer with a
(d) a hydroxyalkyl acid in which the hydroxy and acid groups are separated by at least four atoms or with a diol having both a primary hydroxyl group and a secondary hydroxyl group and then with a cyclic anhydride
and, optionally, with one or more members selected from the group consisting of (e) hydroxyethylene ethyl urea, (f) methoxypolyethylene glycols, and (g) other, different materials having a functional group reactive with isocyanate.

12 Claims, No Drawings

PIGMENT DISPERSANT, METHOD OF MAKING COATING COMPOSITIONS, AND COATING COMPOSITIONS

FIELD OF THE INVENTION

The invention relates pigment dispersants and methods of making coating compositions with pigment dispersants.

BACKGROUND OF THE INVENTION

Coating finishes, particularly exterior coating finishes in the automotive industry, are generally applied in two or more distinct layers. One or more layers of primer coating composition may be applied to the unpainted substrate first, followed by one or more topcoat layers. Basecoat-clearcoat composite coatings are particularly useful as topcoats for which exceptional gloss, depth of color, distinctness of image, or special metallic effects are desired. The basecoat layer contains the colorants that provide the color for the topcoat, while the clearcoat layer provides a smooth, glossy finish. The automotive industry has made extensive use of these coatings for automotive body panels.

The colorants in automotive basecoat compositions are typically one or more dispersed pigments. Pigment dispersion in the composition must accomplish at least two objectives. First, the pigment should be as fully wet-out as possible for optimum color development in the coating layer. Secondly, the pigment should be stabilized against hard settling and re-agglomeration of the pigment particles so that the basecoat composition will have a reasonably long shelf-life. Many types of dispersants have been suggested for solventborne compositions. The options for waterborne compositions has been more limited, as the dispersant must itself be water-dispersible. Nonetheless, waterborne basecoat compositions are in need of the same good color development and stability as solventborne basecoat compositions. A pigment dispersant useful in both solventborne and waterborne compositions would simplify manufacturing and storage because the same dispersant intermediate could be synthesized and used to made pigment dispersions for either solventborne or waterborne compositions.

SUMMARY OF THE INVENTION

The present invention provides pigment dispersions offering excellent color development in coating compositions, particularly for basecoat coating compositions.

A pigmented coating composition of the invention comprises at least one pigment dispersed in an acrylic polymer, wherein the acrylic polymer is prepared by first polymerizing a mixture of ethylenically unsaturated monomers comprising: (a) at least about 15% by weight unsaturated meta-isopropenyl-α,α-dimethylbenzyl isocyanate (abbreviated as TMI), (b) at least one further aromatic polymerizable monomer, in an amount so that monomers (a) and (b) combined are at least about 50 percent by weight of the mixture of ethylenically unsaturated monomers, and (c) at least one alkyl (meth)acrylate, and, secondly, reacting the isocyanate groups of the polymer with (d) a hydroxyalkyl acid in which the hydroxy and acid groups are separated by at least four atoms or with a diol having both a primary hydroxyl group and a secondary hydroxyl group and then with a cyclic anhydride, (e) optionally also with hydroxyethylene ethyl urea, (f) optionally also with a methoxypolyethylene glycol, and (g) optionally also with a different material having a functional group reactive with isocyanate. The composition containing the pigment dispersed in the acrylic polymer may be solventborne or waterborne. Preferably, the basecoat composition also comprises a film-forming polymer other than the acrylic polymer dispersing the pigment, and preferably a crosslinking agent.

The coating compositions of the invention exhibit excellent color development, humidity resistance, and adhesion.

As used herein, "(meth)acrylate" refers to both the acrylate and methacrylate compound. "A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The coating composition includes at least one pigment dispersed in an acrylic polymer. The acrylic polymer dispersant is prepared by first polymerizing a mixture of ethylenically unsaturated monomers comprising: (a) at least about 15% by weight TMI, (b) at least one further aromatic polymerizable monomer in an amount so that the monomers (a) and (b) combined are at least about 50 percent by weight of the mixture of ethylenically unsaturated monomers, and (c) at least one alkyl (meth)acrylate, and then reacting the isocyanate groups of the polymer with (d) a hydroxyalkyl acid in which the hydroxy and acid groups are separated by at least four atoms or with a diol having both a primary hydroxyl group and a secondary hydroxyl group and then with a cyclic anhydride and optionally one or more of (e) hydroxyethylene ethyl urea, (f) methoxypolyethylene glycols, and (g) different materials having a functional group reactive with isocyanate.

Suitable examples of aromatic polymerizable monomers (b) include, without limitation, styrene, α-methyl styrene, vinyl toluene, tert-butyl styrene, and combinations of these. The mixture of ethylenically unsaturated monomers used to prepare the dispersing acrylic polymer preferably includes at least styrene. The monomers (a) and (b) combined are at least about 50 percent by weight of the mixture of ethylenically unsaturated monomers, preferably at least about 60 percent by weight of the mixture of ethylenically unsaturated monomers, and preferably up to about 75 percent by weight of the mixture of ethylenically unsaturated monomers.

The mixture of ethylenically unsaturated monomers further includes at least one alkyl (meth)acrylate. Suitable examples of alkyl (meth)acrylates (c) include, without limitation, esters of acrylic and methacrylic acids from reaction with saturated aliphatic alcohols containing 1 to 20 carbon atoms, such as methyl, ethyl, propyl, isopropyl, n-butyl, isobutyl, tert-butyl, hexyl, 2-ethylhexyl, dodecyl, cyclohexyl, alkyl-substituted cyclohexyl, alkanol-substituted cyclohexyl, such as 2-tert-butyl and 4-tert-butyl cyclohexyl, 4-cyclohexyl-1-butyl, and 3,3,5,5,-tetramethyl cyclohexyl; isobornyl, lauryl, and stearyl alcohols.

The mixture of ethylenically unsaturated monomers may include other ethylenically unsaturated, polymerizable monomers other than the monomers (a), (b), and (c). Representative examples of other ethylenically unsaturated polymerizable monomers include, without limitation, such compounds as fumaric, maleic, and itaconic monoesters and diesters with alcohols such as methanol, ethanol, propanol, isopropanol, butanol, isobutanol, and tert-butanol and vinyl monomers such as vinyl acetate, vinyl propionate, vinyl ethers such as vinyl ethyl ether, vinyl and vinylidene halides, vinyl ethyl ketone, and 2-vinyl pyrrolidone.

The acrylic polymer is prepared from the mixture of ethylenically unsaturated monomers according to usual methods, such as by bulk or solution polymerization. The acrylic polymers may be prepared as solutions in an organic solvent medium, preferably selected from water-soluble or water-miscible organic solvents, and then dispersed into water. After dispersion into water, the organic solvent may be distilled from the aqueous dispersion or emulsion. The acrylic polymer preferably has a weight average molecular weight of from about 8,000 to about 100,000.

The polymerization may be carried out by free radical polymerization. The free radical source is typically supplied by a redox initiator or by an organic peroxide or azo compound. Useful initiators include, without limitation, ammonium peroxydisulfate, potassium peroxydisulfate, sodium metabisulfite, hydrogen peroxide, t-butyl hydroperoxide, dilauryl peroxide, t-butyl peroxybenzoate, 2,2'-azobis (isobutyronitrile), and redox initiators such as ammonium peroxydisulfate and sodium metabisulfite with ferrous ammonium sulfate. Optionally, a chain transfer agent may be used. Typical chain transfer agents include mercaptans such as octyl mercaptan, n- or tert-dodecyl mercaptan, thiosalicylic acid, mercaptoacetic acid, and mercaptoethanol; halogenated compounds; and dimeric alpha-methyl styrene.

After polymerization, the isocyanate groups of the polymer are reacted with (d) a hydroxyalkyl acid in which the hydroxy and acid groups are separated by at least four atoms or with a diol having both a primary hydroxyl group and a secondary hydroxyl group and then with a cyclic anhydride and optionally one or more of (e) hydroxyethylene ethyl urea, (f) methoxypolyethylene glycols, and (g) different materials having a functional group reactive with isocyanate to form the acrylic polymer dispersant.

The isocyanate groups of the polymer are reacted with a sufficient amount of hydroxyalkyl acid or diol and then cyclic anhydride so that the acrylic polymer dispersant has an acid number of at least about 20, preferably at least about 25, and has an acid number of up to about 35, preferably up to about 30. The units for acid number are mg KOH/g. Suitable examples of hydroxyalkyl acids include, without limitation, 12-hydroxystearic acid, 6-hydroxyhexanoic acid, 4-hydroxycyclohexane carboxylic acid, and reaction products of hydroxyalkyl acids with epsilon-caprolactone in which the ester product contains three or fewer monomer units from the epsilon caprolactone (e.g., the reaction of one mole of 2-hydroxyisobutyric acid with from one to three moles of epsilon-caprolactone). In an alternative route, the isocyanate groups of the polymer are reacted with a diol having both a primary hydroxyl group and a secondary hydroxyl group, e.g. 1,10-octadecanediol, then the unreacted secondary hydroxyl group is reacted with a cyclic anhydride, e.g. hexahydrophthalic anhydride.

If the acrylic polymer dispersant is used to prepare a waterborne coating composition, then the acid functionality may be salted, preferably with an alkali or base, preferably an amine, even more preferably a tertiary amine. Examples of suitable salting materials include, without limitation, ammonia, monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine propylenediamine, ethylethanolamine, dimethylethanolamine, diethylethanolamine, 2-amino-2-methylpropanol, and morpholine. Preferred salting materials include 2-amino-2-methylpropanol and dimethylethanolamine.

The isocyanate groups of the polymer may also be reacted with one or more of (e) hydroxyethylene ethyl urea, (f) methoxypolyethylene glycols, and (g) other materials having a functional group reactive with isocyanate. The amount of TMI reacted into the acrylic polymer is selected to provide the desired amount of isocyanate groups for reaction with the hydroxyalkyl acid in which the hydroxy and acid groups are separated by at least four atoms or the diol and cyclic anhydride and the desired reactants from the group of hydroxyethylene ethyl urea, methoxypolyethylene glycols, and other materials having a functional group reactive with isocyanate.

In a preferred embodiment, isocyanate groups of the acrylic polymer are reacted with up to about 10% by weight, based on the weight of the acrylic polymer dispersant, of hydroxyethylene ethyl urea. Still more preferably, isocyanate groups of the acrylic polymer are reacted with at least about 1% by weight, more preferably at least about 5% by weight, of hydroxyethylene ethyl urea, based on the weight of the acrylic polymer dispersant.

It is also preferred that isocyanate groups of the acrylic polymer are reacted with up to about 40% by weight, more preferably up to about 30% by weight, still more preferably up to about 15% by weight, based on the weight of the acrylic polymer dispersant, of a methoxypolyethylene glycol. It is preferred to react the isocyanate groups of the acrylic polymer with at least about 5% by weight, based on the weight of the acrylic polymer dispersant, of a methoxypolyethylene glycol. Preferred examples of methoxypolyethylene glycols are those having number average molecular weights of at least about 750, more preferably at least about 1000, and those having molecular weights of up to about 4500, more preferably up to about 3000, and still more preferably up to about 2500.

It is also preferred that isocyanate groups of the acrylic polymer are reacted with one or more other materials having a functional group reactive with isocyanate. In one preferred embodiment, reaction with these other materials is conducted in a step after reaction with the hydroxyalkyl acid in which the hydroxy and acid groups are separated by at least four atoms and hydroxyethylene ethyl urea, diol and cyclic anhydride, methoxypolyethylene glycol, if used, and/or hydroxyethylene ethyl urea, if used; that is, the other materials are reacted with residual isocyanate functionality on the polymer. Other materials having a functional group reactive with isocyanate include, without limitation, alcohols and polyols, amines and polyamines, amino alcohols, and mercaptans. Preferred among these are amino alcohols such as ethanolamine and diethanolamine; propylene glycol ethers such as propylene glycol methyl ether, propylene glycol ethyl ether, propylene glycol n-propyl ether, and propylene glycol n-butyl ether; and hydroxyalkyl carbamate compounds such as hydroxyethyl carbamate and hydroxypropyl carbamate.

The reaction of the isocyanate groups of the acrylic resin with (d) the hydroxyalkyl acid in which the hydroxy and acid groups are separated by at least four atoms or with the diol and cyclic anhydride and optionally with (e) hydroxyethylene ethyl urea, (f) methoxypolyethylene glycol, and/or (g) other materials having a functional group reactive with isocyanate, if included, may be carried out under suitable reaction conditions. Representative reaction conditions include, without limitation, reaction in the polymerization solvent, reaction at temperatures of about 70° C. to about 130° C., and reaction in the presence of suitable catalysts for isocyanate reactions, such as dibutyl tin oxide and dibutyl tin dilaurate.

The coating compositions according to the invention further include a pigment that may be selected from any organic or inorganic compounds or colored materials. Examples of suitable classes of organic pigments that may be used include, without limitation, metallized and non-metallized azo pigments, azomethine pigments, methine pigments, anthraquinone pigments, phthalocyanine pigments, perinone pigments, perylene pigments, diketopyrrolopyrrole pigments, thioindigo pigments, iminoisoindoline pigments, iminoisoindolinone pigments, quinacridone pigments such as quinacridone reds and violets, flavanthrone pigments, indanthrone pigments, anthrapyrimidine pigments, carbazole pigments, monoarylide and diarylide yellows, benzimidazolone yellows, tolyl orange, naphthol orange, and quinophthalone pigments. Examples of suitable inorganic pigments include, without limitation, metal oxide pigments such as titanium dioxide, iron oxides including red iron oxide, black iron oxide, and brown iron oxide, and chromium oxide green; carbon black; ferric ferrocyanide (Prussian blue); ultramarine; lead chromate; and so on.

The color pigment or pigments are dispersed in the acrylic polymer dispersant according to known methods. In general, dry pigment and the acrylic polymer dispersant are brought into contact under a shear high enough to break the pigment agglomerates down to the primary pigment particles and to wet the surface of the pigment particles. The breaking of the agglomerates and wetting of the primary pigment particles are important for pigment stability and color development. All of the pigments may be dispersed together in the acrylic polymer dispersant or separate pigment dispersions may be made for one or more pigments that are then combined in the coating composition.

The coating composition may also include fillers and/or metallic or other inorganic flake materials such as pearlescent mica flake pigments or metallic flake pigments such as aluminum flake. Metallic basecoat colors are produced using one or more special flake pigments. Metallic colors are generally defined as colors having gonioapparent effects. For example, the American Society of Testing Methods (ASTM) document F284 defines metallic as "pertaining to the appearance of a gonioapparent material containing metal flake." Metallic basecoat colors may be produced using metallic flake pigments like aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance when viewed at different angles. Unlike the solid color pigments, the flake pigments do not agglomerate and are not ground under high shear because high shear would break or bend the flakes or their crystalline morphology, diminishing or destroying the gonioapparent effects. The flake pigments may be dispersed with the acrylic polymer dispersant, but may also be dispersed with the crosslinker or another film-forming resin or polymer, by stirring under low shear.

When the coating composition is a basecoat composition, it typically has a pigment to binder ratio of about 0.04 to about 1.0, depending on the pigments used.

The coating compositions of the present invention preferably also include a film-forming polymer or resin other than the acrylic polymer dispersing the pigment. Suitable examples of such film-forming polymers and resins include, without limitation, acrylic polymers, polyesters, polyurethanes, and modified polyurethanes such as graft copolymers. The film-forming polymers and resins generally have reactive groups, such as active hydrogen groups, particularly hydroxyl groups.

The coating compositions of the present invention preferably also include a crosslinker component. The crosslinker component includes one or more crosslinkers reactive with active hydrogen functionality. Examples of crosslinkers reactive with active hydrogen functionality include, without limitation, materials having active methylol or methylalkoxy groups, including aminoplast resins or phenol/formaldehyde adducts; blocked polyisocyanate curing agents; tris(alkoxy carbonylamino) triazines (available from Cytec Industries under the designation TACT); and combinations thereof. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble. Examples of blocked polyisocyanates include isocyanurates of toluene diisocyanate, isophorone diisocyanate, and hexamethylene diisocyanate blocked with a blocking agent such as an alcohol, an oxime, or a secondary amine such as pyrazole or substituted pyrazole.

The crosslinker component preferably is from about 2% by weight to about 40% by weight, and more preferably from about 15% by weight to about 35% by weight, and particularly preferably about 20% to about 30% by weight of the combined nonvolatile weights of the film-forming materials.

The coating compositions may include one or more catalysts. The type of catalyst depends upon the particular crosslinker component composition utilized. Useful catalysts include, without limitation, blocked acid catalysts, such as para-toluene sulfonic acid, dodecylbenzene sulfonic acid, and dinonylnaphthylene disulfonic acid blocked with amines; phenyl acid phosphate, monobutyl maleate, and butyl phosphate, hydroxy phosphate ester; Lewis acids, zinc salts, and tin salts, including dibutyl tin dilaurate and dibutyl tin oxide.

The coating compositions may be solventborne or waterborne. Suitable solvents for solventborne compositions include, without limitation, esters, alcohols, and substituted aromatic solvents. Waterborne compositions may include, in addition to water, organic cosolvents such as, without limitation, alkyl ethers of propylene and ethylene glycol and dimmers thereof.

Other conventional materials, such as flow control or rheology control agents, antioxidants, hindered amine light absorbers, and other conventional coatings additives may be added to the compositions.

The coating compositions of the present invention are preferably applied as basecoats on automotive articles, such as metal or plastic automotive bodies or elastomeric fascia. It is preferred to have a layer of a primer surfacer before application of the basecoat coating composition of the invention. A clearcoat composition is preferably applied over the basecoat composition.

A preferred composite coating of the invention has, as one layer, a basecoat coating layer that is obtained from the aqueous basecoat composition of the invention. The composite coating has a clearcoat layer applied over the basecoat coating layer. Crosslinking compositions are preferred for forming the clearcoat layer. Coatings of this type are well-known in the art and include waterborne compositions as well as solventborne compositions. For example, the clearcoat according to U.S. Pat. No. 5,474,811 may be applied wet-on-wet over a layer of the basecoat composition. Polymers known in the art to be useful in clearcoat compositions include, without limitation, acrylics, vinyl, polyurethanes, polycarbonates, polyesters, alkyds, and polysiloxanes. Acrylics and polyurethanes are preferred. Thermoset clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above. In one embodiment, waterborne clearcoat compositions having low volatile organic content are used. The waterborne clearcoat compositions preferably has a volatile organic content of less than about 1.5, more preferably less than about 1.3.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer surfacer coating composition, basecoat composition of the invention, and the clearcoat composition layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

Basecoat-clearcoat topcoats are usually applied wet-on-wet. The compositions are applied in coats separated by a flash, as described above, with a flash also between the last coat of the basecoat composition and the first coat the clearcoat composition. The two coating layers are then cured simultaneously. Preferably, the cured basecoat layer is 0.5 to 1.5 mils thick, preferably a thickness at least to hiding, and the cured clear coat layer is 1 to 3 mils, more preferably 1.6 to 2.2 mils, thick.

The coating compositions described are preferably cured with heat. Curing temperatures are preferably from about 70° C. to about 180° C., and particularly preferably from about 170° F. to about 200° F. for a composition including an unblocked acid catalyst, or from about 240° F. to about 275° F. for a composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following examples. The examples are merely illustrative and do not in any way limit the scope of the invention as described and claimed.

EXAMPLES

Example 1

Pigment Dispersant of the Invention

A 3-liter glass reactor equipped with a heating mantle, condenser, thermometer and addition funnel was charged with 84 grams methyl isoamyl ketone. The charged methyl isoamyl ketone was heated to reflux (about 142–145° C.). A mixture of 46 grams styrene, 131 grams TMI (meta-isopropenyl-α,α-dimethylbenzyl isocyanate), 70 grams butyl acrylate, 77 grams butyl methacrylate, 4 grams methyl isoamyl ketone and 32 grams t-butyl peracetate (50% active) was place in the additional funnel. The mixture was added to the reactor, maintained at 142–145° C., over a period of four hours. After all the mixture had been added, the addition funnel with flushed with 10 grams methyl isoamyl ketone. The batch was held at 142–145° C. for an additional one-half hour. Then 16 grams t-butyl peracetate (50% active) was added by the addition funnel, which was flushed with 7 grams methyl isoamyl ketone. The batch was held at 142–154. ° C. for 1.5 hours, then cooled to 60° C.

At that temperature, 131 grams hydroxystearic acid were added. The reactor temperature was raised to 120° C. and held there until the reaction mixture had an isocyanate content of about 1.45%. Then, 25 grams of hydroxyethylene urea were added and the reaction continued to zero % isocyanate content. At that point, heating was discontinued and 445 grams propyl propasol were added while cooling the reaction mixture to 40° C. 30 grams amino methyl propanol were added and the reaction mixture was stirred for 5 minutes. Then 470 grams deionized water were added gradually with stirring until a homogeneous product was obtained. The product had a nonvolatile content of 32.98% by weight, a pH of 7.93, and an acid number on nonvolatiles of 49.80 mg KOH/g nonvolatile.

Example 2

Pigment Dispersant of the Invention

A 3-liter glass reactor equipped with a heating mantle, condenser, thermometer and addition funnel was charged with 84 grams methyl isoamyl ketone. The charged methyl isoamyl ketone was heated to reflux (about 142–145° C.). A mixture of 46 grams styrene, 131 grams TMI (meta-isopropenyl-α,α-dimethylbenzyl isocyanate), 70 grams butyl acrylate, 77 grams butyl methacrylate, 4 grams methyl isoamyl ketone and 32 grams t-butyl peracetate (50% active) was place in the additional funnel. The mixture was added to the reactor, maintained at 142–145° C., over a period of four hours. After all the mixture had been added, the addition funnel with flushed with 10 grams methyl isoamyl ketone. The batch was held at 142–145° C. for an additional one-half hour. Then 16 grams t-butyl peracetate (50% active) was added by the addition funnel, which was flushed with 7 grams methyl isoamyl ketone. The batch was held at 142–154° C. for 1.5 hours, then cooled to 60° C.

At that temperature, 57 grams hydroxystearic acid and 79 grams methoxy polyethylene glycol (2000 Mw). The reactor temperature was raised to 120° C. and held there until the reaction mixture had an isocyanate content of about 2.90%. Then, 26 grams of hydroxyethylene urea were added and the reaction continued to about 0.75% isocyanate content. Next, 445 grams propyl propasol were added and the reaction continued to zero % isocyanate. The reaction mixture was cooled to 40° C., where 17 grams amino methyl propanol were added and mixed in for 5 minutes. Then 435 grams deionized water were added gradually with stirring until a homogeneous product was obtained. The product had a nonvolatile content of 34.67% by weight, a pH of 7.28, and an acid number on nonvolatiles of 20.43 mg KOH/g nonvolatile.

Example 3

Red Pigment Composition According to the Invention

A red pigment composition was prepared by adding 14.31 parts by weight perylene pigment (C.I. Pigment Red 179) to a stirred mixture of 16.74 parts by weight pigment dispersant resin prepared in accordance with Example 1, 16.74 parts by weight of a polyurethane resin, 4.58 parts by weight propylene glycol n-propyl ether, 45.71 parts deionized water, and 1.92 parts by weight of a commercial polyalkylene additive. The resultant mixture was stirred on a Cowles disperser for thirty minutes and milled in an Eiger bead mill for two and a half hours.

Comparative Example A

Comparative Red Pigment Composition

A comparative red pigment composition was prepared by adding 14.31 parts by weight perylene pigment (C.I. Pigment Red 179) to a stirred mixture of 16.74 parts by weight of an acrylic grind resin that was not prepared according to the invention, 16.74 parts by weight of a polyurethane resin, 4.58 parts by weight propylene glycol n-propyl ether, 45.71 parts deionized water, and 1.92 parts by weight of a commercial polyalkylene additive. The resultant mixture was stirred on a Cowles disperser for thirty minutes and milled in an Eiger bead mill for two and one-half hours.

Example 4

Blue Pigment Composition According to the Invention

A blue pigment composition was prepared by adding 14.28 parts by weight indanthrone pigment (C.I. Pigment Blue 60) to a stirred mixture of 19.04 parts by weight pigment dispersant resin prepared in accordance with Example 2, 8.57 parts by weight propylene glycol n-propyl ether, and 58.11 parts by weight deionized water. The resultant mixture was stirred on a Cowles disperser for thirty minutes and milled in an Eiger bead mill for ten hours.

Comparative Example B

Comparative Blue Pigment Composition

A blue pigment paste was prepared by adding 14.28 parts by weight indanthrone pigment (C.I. Pigment Blue 60) to a stirred mixture of 19.04 parts by weight of an acrylic grind resin that was not prepared according to the invention, 8.57 parts by weight propylene glycol n-propyl ether, and 58.11 parts by weight deionized water. The resultant mixture was stirred on a Cowles disperser for thirty minutes and milled in an Eiger bead mill for ten hours.

Example 5

Coating Composition According to the Invention

A coating composition was prepared that contained the red pigment composition of Example 3 by combining with rapid stirring 79.94 parts by weight of an unpigmented basecoat mixture, 16.18 parts by weight of the red pigment composition of Example 3, 1.16 parts by weight of a black tinting paste (prepared by mixing an anionic polyurethane resin with carbon black pigment, stirring the mixture on a Cowles disperser for thirty minutes, and milling the stirred mixture in an Eiger bead mill for two and one-half hours). and 7.72 parts by weight of a mica pigment dispersion (prepared by slurrying 2.20 parts by weight iron oxide coated mica in a combination of 2.54 parts by weight of polyester resin and 2.54 parts by weight propylene glycol n-propyl ether, then adding 0.44 parts by weight of a 20% aqueous solution of amine). Stirring was continued for about thirty minutes.

Comparative Example C

Comparative Coating Composition

A coating composition was prepared according to Example 5, except that the 16.18 parts by weight of the red pigment composition of Example 3 was replaced by 16.18 parts by weight of the comparative red pigment composition of Comparative Example A.

Example 6

Coating Composition According to the Invention

A coating composition was prepared that contained the blue pigment composition of Example 4 by combining with rapid stirring 82.62 parts by weight of the unpigmented basecoat mixture used in Example 5 and 7.83 parts by weight of the blue pigment composition of Example 4 premixed with 9.55 parts by weight of an aluminum pigment dispersion (prepared by slurrying 4.01 parts by weight aluminum pigment in a combination of 2.55 parts by weight of polyester resin and 2.55 parts by weight propylene glycol n-propyl ether, then adding 0.44 parts by weight of a 20% aqueous solution of amine). Stirring was continued for about thirty minutes.

Comparative Example D

Comparative Coating Composition

A coating composition was prepared according to Example 6, except that the 7.83 parts by weight of the blue pigment composition of Example 4 was replaced by 7.83 parts by weight of the comparative blue pigment composition of Comparative Example B.

Testing of Coating Compositions

The coating compostions of Examples 5 and 6 and Comparative Examples C and D were applied as basecoats and cured according to established procedures and equipment.

The color development in the coatings and stability of the coating compositions were compared. The film derived from the coating composition of Example 5 showed excellent metallic effect as a result of good transparency in the red pigment. The coating composition of Example 5 showed no instability after makeup and storage.

The basecoat coating colors were measured by a goniospectrophotometer at 25 degrees from specular with results as indicated below.

| Coating Composition | L* (brightness) | a* (red index) | b* (yellow index) |
| --- | --- | --- | --- |
| Example 5 | 27.1 | 42.2 | 23.3 |
| Comparative Example C | 24.9 | 38.8 | 19.7 |
| Example 6 | 62.32 | −3.90 | −43.29 |
| Comparative Example D | 65.10 | −6.85 | −42.52 |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coating composition comprising at least one pigment dispersed in an acrylic polymer, wherein the acrylic polymer is prepared by
   first polymerizing a mixture of ethylenically unsaturated monomers comprising:
   (a) at least about 15% by weight unsaturated meta-isopropenyl-α, α-dimethylbenzyl isocyanate;
   (b) at least one further aromatic polymerizable monomer, in an amount so that monomers (a) and (b) combined are at least about 50 percent by weight of the mixture of ethylenically unsaturated monomers; and
   (c) at least one alkyl (meth)acrylate to form a polymer, and secondly, reacting the isocyanate groups of the polymer with
   (d) a hydroxyalkyl acid in which the hydroxyl and acid groups are separated by at least four atoms or with a diol having both the primary hydroxyl group and a secondary hydroxyl group and then with a cyclic anhydride
   and
   (e) hydroxyethylene ethyl urea.

2. A coating composition according to claim 1, wherein monomer (b) is selected from the group consisting of styrene, α-methyl styrene, vinyl toluene, tert-butyl styrene, and combinations thereof.

3. A coating composition according to claim 1, wherein the acrylic polymer has a weight average molecular weight of from about 10,000 to about 70,000.

4. A coating composition according to claim 1, wherein monomer (b) comprises at least styrene.

5. A coating composition according to claim 1, wherein the monomers (a) and (b) comprises at least about 60 percent by weight of the mixture of ethylenically unsaturated monomers.

6. A coating composition according to claim 1, wherein the monomers (a) and (b) comprises up to about 75 percent by weight of the mixture of ethylenically unsaturated monomers.

7. A coating composition according to claim 1, wherein the isocyanate group of the polymer are reacted with a sufficient amount of the hydroxyalkyl acid or the diol and cyclic anhydride (d) so that the acrylic polymer has an acid number of from about 20 mg KOH/g to about 35 mg KOH/g.

8. A coating composition according to claim 1, wherein the isocyanate groups of the polymer are reacted with a sufficient amount of the hydroxyalkyl acid or the diol and cyclic anhydride (d) so that the acrylic polymer has an acid number from about 25 mg KOH/g to about 30 mg KOH/g.

9. A coating composition according to claim 1, wherein the isocyanate groups of the polymer are reacted with a member selected from the group consisting of amino alcohols, propylene glycol ethers, hydroxyalkyl carbamate compounds, and combinations thereof.

10. A coating composition according to claim 1, wherein the acrylic polymer comprises from about 5% by weight to about 10% by weight of the hydroxyethylene ethyl urea (e) reacted with the isocyanate groups.

11. A coating according to claim 1, wherein the coating composition is a waterborne coating composition.

12. A coating according to claim 1, wherein the coating composition is a solventborne coating composition.

* * * * *